(12) United States Patent
Noguchi et al.

(10) Patent No.: US 6,803,086 B2
(45) Date of Patent: Oct. 12, 2004

(54) POROUS HONEYCOMB STRUCTURE BODY, THE USE THEREOF AND METHOD FOR MANUFACTURING THE SAME

(75) Inventors: Yasushi Noguchi, Nagoya (JP); Yukihisa Wada, Nisshin (JP); Yumi Muroi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/325,744

(22) Filed: Dec. 23, 2002

(65) Prior Publication Data

US 2003/0143370 A1 Jul. 31, 2003

(30) Foreign Application Priority Data

Jan. 21, 2002 (JP) ........................................ 2002-012113
Dec. 4, 2002 (JP) ........................................ 2002-352600

(51) Int. Cl.[7] .............................................. B32B 3/12
(52) U.S. Cl. ................. 428/116; 428/304.4; 428/310.5; 264/44; 264/628; 264/631; 264/652; 264/656; 264/657; 264/660; 264/661; 422/122; 422/177; 422/180; 422/222
(58) Field of Search ........................... 428/593, 73, 116, 428/304.4, 310.5; 264/41, 42, 43, 44, 628, 630, 631, 652, 656, 657, 660, 661; 422/122, 168, 177, 180, 211, 222; 55/523

(56) References Cited

U.S. PATENT DOCUMENTS

| | | | |
|---|---|---|---|
| 5,030,398 A | * | 7/1991 | Hamanaka et al. .......... 264/631 |
| 5,069,697 A | | 12/1991 | Hamaguchi et al. |
| 5,545,243 A | | 8/1996 | Kotani et al. |

FOREIGN PATENT DOCUMENTS

| | | | | |
|---|---|---|---|---|
| JP | 0 753 490 A1 | * | 7/1996 | ......... C04B/35/195 |
| JP | A-09-77573 | | 3/1997 | |
| JP | B2-2578176 | | 3/1997 | |
| JP | B2-2726616 | | 12/1997 | |
| JP | 2001-260117 | * | 9/2001 | ............. B28B/3/20 |

\* cited by examiner

*Primary Examiner*—John J. Zimmerman
*Assistant Examiner*—Wendy Boss
(74) *Attorney, Agent, or Firm*—Oliff & Berridge, PLC

(57) ABSTRACT

There are provided a porous honeycomb structure body capable of satisfying a pressure loss and isostatic strength which are mutually contradictory properties simultaneously and a method for manufacturing the same. In a porous honeycomb structure body having partition walls which contain cordierite as a primary crystal phase and have a porosity of 40 to 75% and an average pore diameter of 10 to 50 μm, porosity and an average pore diameter in a center portion of the structure body are made larger than porosity and an average pore diameter in a peripheral portion of the structure body.

11 Claims, 6 Drawing Sheets

POROUS HONEYCOMB STRUCTURE BODY, THE USE THEREOF AND METHOD FOR MANUFACTURING THE SAME

BACKGROUND OF THE INVENTION

1. Field of the Invention

The present invention relates to a porous honeycomb structure body, the use thereof and a method for manufacturing the same. More specifically, it relates to a porous honeycomb structure body having a reduced pressure loss, with maintaining isostatic strength, by control of distributions of porosity and a pore diameter of the structure body, the use thereof and to a method for manufacturing the structure body. The porous honeycomb structure body of the present invention can be preferably used particularly as a particulate filter for exhaust gas purification, and a carrier for catalyst.

2. Description of the Related Art

Recently, the influence of particulate matter and NOx discharged from an automobile engine, especially a diesel engine or the like on environment has been increasingly receiving attention. Therefore, various research and developmental works have been made on the use of porous honeycomb structure body as important means for collecting and removing such deleterious substances.

For example, a honeycomb structure body is under developing to collect and remove particulate materials in exhaust gas by making exhaust gas flow into individual through holes having openings at one of the end faces of the honeycomb structure body comprising a plurality of through holes which are partitioned by porous partition walls and whose openings on an end face where an exhaust gas flows in and an end face where an exhaust gas flows out are alternately sealed, and passing it forcibly the partition walls thereof. A developmental work is also in progress, as a new approach to improve purification ability of such substances, to provide a catalyst made of a honeycomb structure body being composed of a porous structure all of which partition walls have a high porosity to which catalysts for decomposing HC and NOx are loaded in a relatively larger quantity.

Upon use of such a porous honeycomb structure body, it is housed in a metal case or the like by means of a holder with a fixed pressing force so that the structure body would not be displaced from the metal case under continuous vibrations from an engine or the like. Therefore, the structure body is required to have isostatic strength that enables the structure body to endure the pressing force. Especially, an attempt has been made to make the porosity in a honeycomb structure body higher, in responding to the demands in the reduction in pressure loss for less fuel consumption and high output, or the demands of the increase in the loaded amount of the catalysts for improvement of purification ability. Accordingly, it is strongly desired to have a honeycomb structure body provided with a sufficient isostatic strength with satisfying the demands for making the porosity in the honeycomb structure body higher. Incidentally, in the case of a honeycomb structure body installed in the path for exhaust gas, the flow amount of the exhaust gas in the center portion of the honeycomb structure body along with the perpendicular direction of the path for exhaust gas. Thus, the easiness in the flowability of exhaust gas and the decomposed amount of the HC, NOx or the like in the center portion of the honeycomb structure body awfully give influence on overall pressure loss and the purification ability.

As a consequence, the development of the structure bodies and catalyst bodies having a structure capable of copping with the differences in the distribution in flowing gases is earnestly desired.

There has been proposed as a prior art porous honeycomb structure body to attain the objectives mentioned above a porous honeycomb structure body having a prolonged durability time for collection of particulate materials with a reduced frequency of regeneration treatment by constituting the honeycomb structure body to have "a porosity of 45 to 60%, pores with a pore diameter of 100 $\mu$m or more in a volume that corresponds to 10% or less of a total volume of all pores, and a relationship between a total of specific surfaces (Mm$^2$/g) of all pores opening on the surface of the structure body and penetrating the structure body inwardly and surface roughness (N$\mu$m) on the surface of the structure body of 1,000M+85N≧530" (See Japanese Patent No. 2726616).

Further, there is disclosed a porous ceramic honeycomb structure body having significantly prolonged collection time, with the same collection efficiency and the same pressure loss, by having "a porosity of 40 to 55% and a total volume of pores having a diameter of 2 $\mu$m or less being 0.015 cc/g or less" (See Japanese Patent No. 2578176).

In addition, a cordierite honeycomb structure having a high collection rate, a small pressure loss and a small coefficient of thermal expansion simultaneously by having "a thermal expansion coefficient between 25° C. and 800° C. of $0.3 \times 10^{-6}$/° C. or less, a porosity of 55 to 80%, an average pore diameter of 25 to 40 $\mu$m, and smalls pores each having a diameter of 5 to 40 $\mu$m and large pores each having a diameter of 40 to 100 $\mu$m as pores on surfaces of partition walls, the number of the small pores being 5 to 40 times as large as the number of the large pores" is also disclosed (JP-A-9-77573).

However, with respect to any of these honeycomb structure bodies, it has been never given any consideration to simultaneous satisfaction of such a characteristic as the reduction of pressure loss and the attainment in increased isostatic strength which are mutually contradictory one by controlling the pore distribution.

SUMMARY OF THE INVENTION

The present invention has been completed in view of the above problems. An object of the present invention is to provide a porous honeycomb structure body capable of satisfying simultaneously the characteristics of pressure loss and isostatic strength which are mutually contradictory properties, suitable for use particularly in an exhaust gas purification device installed in combustion equipment and which is usable, for example, for a structure body for collecting and removing particulate substances contained in exhaust gas or a catalyst body for decomposing HC, NOx and the like to remove them therefrom, a method for manufacturing the porous honeycomb structure body as well.

The intensive studies have been made so as to solve the above problems. As a result, firstly, we have found the phenomenon that the firing shrinkage of a honeycomb molded article containing a cordierite-forming raw material as a major component and carbon as a pore-forming agent becomes extremely evident when the product temperature of the molded article is within a temperature of 1,000 to 1,200° C., but the firing shrinkage of the molded article hardly occurs when the temperature of the molded article is outside the above-mentioned temperature range of 1,000 to 1,200° C.

Then, we have made further studies and found that a honeycomb structure body having a large pore diameter and porosity in a center portion which greatly influences a reduction in pressure loss can be obtained by using carbon as a pore-forming agent and controlling a temperature increasing rate of a firing environment so as to prevent carbon existing in the center portion of a molded article from burning out until the center portion of the molded article exceeds the above-mentioned temperature range. The present invention has been completed based on the present finding.

That is, according to the present invention, there is provided a porous honeycomb structure body having partition walls which contain cordierite as a primary crystal phase, a porosity of 40 to 75% and an average pore diameter of 10 to 50 µm, wherein the porosity and the pore diameter in a center portion of the honeycomb structure body are larger than those in a peripheral portion of the honeycomb structure body. In the present specification, the phrase "center portion" refers to a midpoint of a central axis of a honeycomb structure body or molded article or a partition wall portion which is the closest to the midpoint, while the phrase "peripheral portion" refers to the outermost partition wall portion from a midpoint of a central axis of a honeycomb structure body or molded article in a direction perpendicular to the central axis. In the honeycomb structure body of the present invention, the porosity and the pore diameter are defined with respect to the "center portion". However, an area having a larger porosity and a larger pore diameter than the peripheral portion may possess a certain spread area from the center portion. Additionally, in the present specification, the terms "porosity" and "pore diameter" mean the average porosity and average pore diameter, unless they are specified.

In the present invention, the porosity in the center portion of the honeycomb structure body is preferably larger than the porosity in the peripheral portion of the honeycomb structure body by 2% or higher, more preferably by 3% or higher, and the pore diameter in the center portion of the honeycomb structure body is preferably larger than the pore diameter in the peripheral portion of the honeycomb structure body by 2 µm or larger, more preferably by 3 µm or larger.

Further, according to the present invention, there is also provided a method for manufacturing a porous honeycomb structure body which comprises the steps of preparing a molded article having a honeycomb structure by use of a puddle containing a cordierite-forming raw material as a primary raw material and carbon in an amount of at least 5 parts by mass based on 100 parts by mass of the cordierite-forming raw material and drying and firing the obtained molded article, wherein upon firing of the molded article, temperature of a firing environment is increased at a rate at which carbon existing in a center portion of the molded article is burned out within a temperature range of from 1,200° C. to below 1,430° C. in terms of the temperature of the center portion of the molded article.

In the present invention, it is preferable to increase the temperature of firing environment, although depending on the type of carbon to be used, ordinarily at a rate of 20 to 60° C./hr within a temperature range of 400 to 1,150° C.

Further, the temperature of the firing environment is preferably maintained within a temperature range of 1,150 to 1,200° C. for at least 5 hours after the temperature reaches at 1,150° C.

In addition, in the method for manufacturing of the present invention, the molded article having a honeycomb structure is preferably manufactured by use of a puddle containing at least carbon in an amount of 25 parts or less by mass based on 100 parts by mass of the cordierite-forming raw material. Furthermore, the molded article having a honeycomb structure is more preferably manufactured by use of a puddle containing a formable resin in an amount of 5 parts by mass or less based on 100 parts by mass of the cordierite-forming raw material. Moreover, the atmosphere in the firing furnace in which the molded article is fired is preferably set at an oxygen concentration of 7 to 17% by volume at least when temperature of firing environment is from 400 to 1,150° C.

Next, with reference to FIG. 1, a relationship between a temperature increasing rate and pore formation in a firing step in the method for manufacturing of the present invention will be described. FIG. 1 is a graph illustratively showing the state of the temperature of a firing environment and the temperature of a center portion of a honeycomb structure body in a firing step in one embodiment of the present invention. In FIG. 1, a solid line represents temperature of the center portion of the molded article, and dotted lines represent temperature of the firing environment. Further, the temperatures of the center portion of the molded article were measured by inserting an R-thermocouple into a through hole and setting the R-thermocouple in the center portion of the molded article.

As shown in FIG. 1 showing an example wherein a graphite is used as a carbon source, in the method for manufacturing of the present invention, when temperature of firing environment reaches a temperature at which carbon contained as a pore-forming agent can burn, i.e., about 600° C. in FIG. 1, temperature of a center portion of a molded article becomes higher than the environment temperature. This indicates that the carbon contained as a pore-forming agent started to burn and the temperature inside the molded article was increased thereby. When the temperature of the molded article reaches 1,000 to 1,200° C. by further increasing the environment temperature, firing shrinkage of the molded article comprising a cordierite-forming raw material becomes the most noticeable, although such a phenomenon did not become apparent in the graph.

At this point, if carbon has been already burned out and pores are already formed in the honeycomb structure, the pore diameter formed in the honeycomb structure is shrunk due to the firing shrinkage. If the carbon still remains as in the example shown in FIG. 1, however, firing proceeds with maintaining the diameters of the pores at the diameters of carbon. Further, when temperature of the molded article exceeds 1,200° C. with increasing the firing environment temperature, the firing shrinkage of the molded article becomes small. Moreover, if carbon is completely burned out at this point, pores substantially equal to the diameters being originally possessed by carbon are formed. Hence, the pores thus formed may have larger diameters, compared with the diameter of the pores having been formed as shrunk one due to the burning out of carbon below temperature of 1,000° C.

When carbon in the molded article is burned out in a certain portion, temperature of that portion of the molded article sharply decreases to the environment temperature or below. Namely, if that portion is the central portion of the molded article, one may observe the occurrence of a peak at temperature from 1,200 to 1,300° C., as is shown in FIG. 1. That is, if an inner temperature of the molded article, at which such a sharp temperature change as mentioned above occurs, overlaps 1,000 to 1,200° C. of the environment temperature in which the firing shrinkage of the molded article is observed the most noticeably, the firing shrinkage is enhanced. Resultantly, tears in the structure are observed due to firing shrinkage.

Therefore, in the present invention, since the above-mentioned peak temperature, i.e., the inner temperature of the molded article at the time when carbon being present in the center portion of the molded article is burned out, is controlled so as to exceed 1,200° C. by controlling the temperature increasing rate of the firing environment, pores of the honeycomb structure being present in the center portion thereof may have a diameter equal to that of carbon having been present in the center portion, without causing tears due to firing shrinkage.

Further, carbon present in a peripheral portion of the molded article; said portion being in a more aerobic environment is burned out more easily than carbon present in a central portion including the center portion and is often burned out at a relatively low temperature and forms pores. Thus, diameters thereof are often shrunk due to subsequent firing shrinkage. Accordingly, there are often observed the difference in the porosity and the pore diameter between the central portion and the peripheral portion.

DETAILED DESCRIPTION OF THE PREFERRED EMBODIMENT

Figure 1:
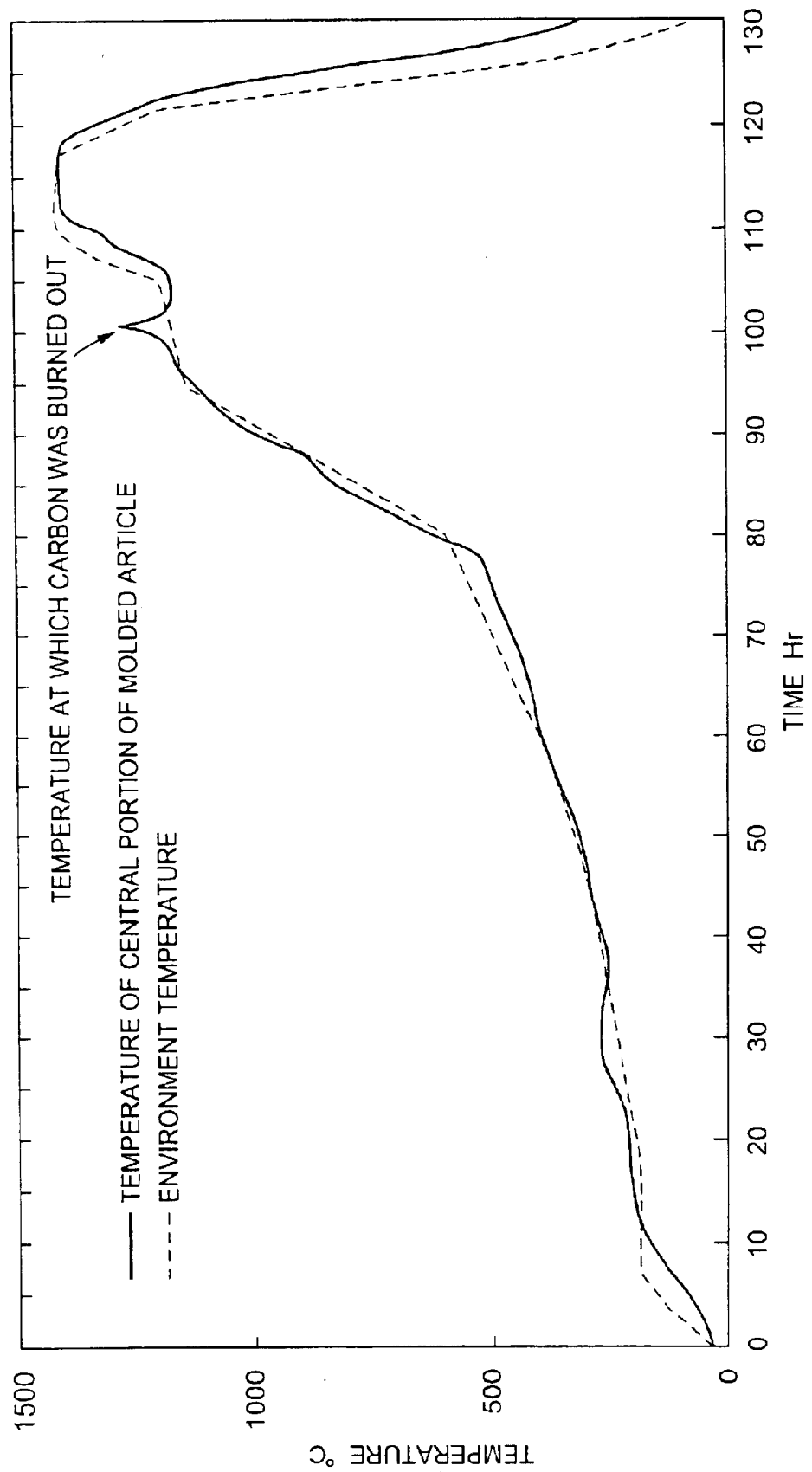
FIG. 1 is a graph illustrating how temperature of a center portion of a molded article and the temperature of a firing environment increased in a firing step in one embodiment of the present invention.

Hereinafter, an embodiment of the present invention will be described in detail.
1. Porous Honeycomb Structure Body The present porous honeycomb structure body is directed to a porous honeycomb structure body having partition walls containing cordierite as a primary crystal phase and having a porosity of 40 to 75% and an average pore diameter of 10 to 50 $\mu$m, and it has such a characteristic point that the porosity and the average pore diameter of the partition walls in the center portion of the honeycomb structure body are larger than the porosity and the average pore diameter of the partition walls in the peripheral portion of the honeycomb structure body.

The reduction in the pressure loss and the improvement in the purification ability can be effectively attained with retaining isostatic strength required at the time of holding the structure body in a case by doing so. That is, one may produce a honeycomb structure body having a larger isostatic strength and higher resistance against not only the breakage in the peripheral walls due to the physical impact which may be given thereto by chance until when the honeycomb structure body is housed in a case period, but also the impact due to the vibration after housing, compared with the one having the same pore diameter, but no practical difference in the pore diameter between the peripheral portion and the center portion, since the pore diameter and the porosity in the peripheral portion are smaller than those in the center portion.

In the present invention, the porosity of the partition wall is adjusted within a range of 40 to 75% since an increase in pressure loss is considerable when it is below 40%, and on the other hand, a reduction in isostatic strength is considerable when it exceeds 75%. For this reason, in the present invention, porosities of all partition walls are preferably 50 to 75%, more preferably 57 to 70%, particularly preferably 65 to 70%.

Further, in the present invention, one should make the porosity of the partition walls in the center portion of the honeycomb structure body larger than the porosity of the partition walls in the peripheral portion of the honeycomb structure body by preferably at least 2%, more preferably at least 3%, particularly preferably at least 5% in terms of the absolute value, thereby the effect in reducing the pressure loss becomes remarkable. That is, the porosity in the center portion is 52 to 72%, preferably 55 to 73%, more preferably 68 to 75%. As far as the porosity of the honeycomb structure body as a whole is within the above-mentioned range, however, a small deviation from the above-mentioned figures due to the manufacturing conditions should be still within the permissible level in the present invention.

Further, in the present invention, how the porosity changes from the peripheral portion toward the center portion is not particularly limited. However, it is preferred that the porosity preferably changes continuously from the peripheral portion toward the center portion. This is because one may produce a honeycomb structure body having a high thermal resistance and a high impact resistance by changing the porosity continuously. Further, in this case, it is preferred that the changing amount in the porosity in the portion until the partition walls forming a series of cells located at ⅓ position of the distance from the most outer periphery to the central axis of the honeycomb structure body shares preferably 30% or higher, particularly preferably 50% or higher of the overall changing amount in the porosity between the most outer periphery and the center of the honeycomb structure body, from the viewpoint of effective reduction in the pressure loss.

Meanwhile, in the present invention, the average pore diameter of the partition walls is controlled within a range of 10 to 50 $\mu$m. This is because an increase in pressure loss is liable to occur early due to clogging of pores when the average pore diameter is below 10 $\mu$m, but a reduction in collection efficiency of particulates becomes considerable while when it exceeds 50 $\mu$m. For this reason, in the present invention, the average pore diameter of the partition walls is preferably 15 to 40 $\mu$m, more preferably 20 to 35 $\mu$m, particularly preferably 25 to 30 $\mu$m.

Further, in the present invention, the pore diameter of the partition walls in the center portion of the honeycomb structure body is larger than the pore diameter of the partition walls in the most outer peripheral portion of the honeycomb structure body by preferably at least 2 μm, more preferably at least 3 μm, particularly preferably at least 5 μm. This is because the effect in reducing the pressure loss becomes remarkable, by constituting the pore diameter as mentioned above. That is, the pore diameter in the center portion is 12 to 52 μm, preferably 17 to 42 μm, more preferably 25 to 37 μm. As far as the average pore diameter of the honeycomb structure body as a whole is within the above-mentioned range, however, a small deviation from the above-mentioned figures due to the manufacturing conditions should be still within the permissible level in the present invention.

Further, in the present invention, there is no particular limitation in the manner how the pore diameter changes from the peripheral portion toward the center portion. However, it is preferred that the pore diameter changes continuously from the peripheral portion toward the center portion, since one may attain a high thermal resistance and a high impact resistance by doing so. Further, in this case, it is preferable to make the change in the average pore diameter in the portion located between the partition walls of the most outer peripheral portion and the partition walls forming a series of cells located at ⅓ position of the distance from the most outer periphery to the central axis of the honeycomb structure body 30% or more larger than the change as a whole; more preferable to make the change in this portion larger than preferably, particularly preferably 50% or more larger than the change as a whole, from the viewpoint of effective reduction in the pressure loss.

Further, in the present invention, constituents of the partition wall are not particularly limited except that its essential component is cordierite. Cordierite may be oriented cordierite, unoriented cordierite, α-crystalline cordierite, β-crystalline cordierite or the like.

Further, the partition walls may also contain other crystal phases such as mullite, zircon, aluminium titanate, clay bond silicon carbide, zirconia, spinel, indialite, sapphirine, corundum, and titania. These crystal phases may be contained solely or in combination of two or more simultaneously.

However, in the present invention, a thermal expansion coefficient of raw materials constituting the partition walls is preferably $1.0 \times 10^{-6}/°$ C. or less at a temperature between 40° C. and 800° C., from the viewpoint of improvement in impact resistance under an elevated temperature during the use at a higher temperature.

In addition, in the present invention, the shape of the honeycomb structure body is also not particularly limited and may be, for example, a cylinder having circular or oval end surfaces, a prism having end surfaces having the shape of a polygon such as a triangle or a square, or the cylinder or prism whose sides are bent in the shape of a dogleg. Further, the shape of the through hole is also not particularly limited, and its cross section may have a polygonal shape such as a square or an octagon, a circular shape or an oval shape.

Further, one may produce a honeycomb filter from the honeycomb structure body of the present invention by plugging at different end faces alternately a plurality of through holes whose openings. In this case, there is no particular limitation in a plugging agent for plugging the openings, and may be any conventionally usable plugging agent.

One may produce a monolithic catalyst body from the honeycomb structure body of the present invention by loading the partition walls of the body with a catalyst. In the case that the honeycomb structure body is used as carrier for a catalyst body, it is preferable to have a honeycomb structure body having a cell density of 6 to 1500 cells/inch$^2$ (0.9 to 233 cells/cm$^2$), and a partition wall thickness of 50 to 300 μm. Additionally, the length of the honeycomb carrier in its axial direction, i. e., the flow direction of exhaust gas is ordinarily 60 to 300 mm, preferably 100 to 250 mm.

One may form an adsorbing layer on the honeycomb carrier. An adsorbent such as alumina having a high specific surface area, or the one containing zeolite as a major component is usually preferably used. There is any special limitation in zeolite, and thus both natural occurring zeolite or synthetic zeolite may be used. However, it is preferably to use the one having Si/Al ratio of 40 or more, from the viewpoints of the thermal stability, the durability, and hydrophobicity. One may preferably use, for example, ZSM-5, USY, β-zeolite, silicalite, metarosilicate, or the like.

The catalyst component(s) may be loaded directly on the honeycomb structure body, or via the adsorbing layer.

The above-described porous honeycomb structure body of the present invention can be produced by a method which will be described hereinafter or other methods.

2. Method for Manufacturing of Porous Honeycomb Structure Body

In a method for manufacturing of the porous honeycomb structure body of the present invention, firstly, a molded article having a honeycomb structure is manufactured by use of a puddle containing a cordierite-forming raw material as a main raw material and at least carbon as a pore-forming agent.

As a cordierite-forming raw material used in the present invention, those which are obtained by mixing a silica ($SiO_2$) source component such as kaolin, talc, quartz, fused silica or mullite, a magnesia (MgO) source component such as talc or magnesite, and an alumina ($Al_2O_3$) source component such as kaolin, aluminum oxide or aluminum hydroxide so as to attain theoretical composition of a cordierite crystal are generally used. However, for some applications, those whose compositions are deliberately changed from the theoretical composition or those which contain mica, quartz, $Fe_2O_3$, CaO, $Na_2O$ or $K_2O$ as an impurity may also be used. Alternatively, those having types, proportions or particle diameters of constituents controlled while maintaining the theoretical composition so as to control porosity and average pore diameter of a structure body to be obtained may also be used.

Illustrative examples of carbon contained as a pore-forming agent in the present invention include graphite and activated carbon. Graphite can be used as a pore-forming agent which is burned at 600 to 1,200° C., and activated carbon can be used as a pore-forming agent which is burned at 400 to 1,200° C. Further, in the present invention, carbon is incorporated into the puddle in an amount of 5% or more by mass, more preferably 7% or more by mass, particularly preferably 10% or more by mass. When the amount of carbon incorporated as a pore-forming agent is below 5% by mass, it is difficult to cause carbon being contained in the central portion of the molded article to burn out at 1,200° C. or higher even if a temperature increasing rate at the time of firing is controlled, thereby causing such problems that the porosity and the average pore diameter in the center portion of the structure body cannot be made larger, compared with those in the peripheral portion of the structure body. Thus, the tears due to firing shrinkage often occur in the honeycomb structure body.

However, when dielectric drying is performed in a drying step, carbon is preferably incorporated in an amount of 25% or less by mass, more preferably 23% or less by mass, particularly preferably 21% or less by mass, so as to prevent excessive conductivity.

In the present invention, other materials may also be incorporated as a pore-forming agent. Illustrative examples of such materials include a foamable resin, a foamed resin, wheat flour, starch, a phenol resin, a polymethyl methacrylate, a polyethylene, and a polyethylene terephthalate.

Of these, since the foamed resin such as an acrylic microcapsule is initially hollow, it is preferable in that a high-porosity honeycomb structure body can be obtained with the use of a small amount thereof.

However, when a foamable resin which is burned out at a lower temperature than carbon is added in a large amount, pores are formed at a relatively low temperature as the temperature increases and an environment in which carbon burns easily is formed, so that it becomes difficult to control a temperature increasing rate. Therefore, the foamable resin is preferably incorporated in a puddle in an amount of below 5.0% by mass, more preferably 3.0% or less by mass.

In the present invention, as required, other additives such as a binder and a dispersant may be incorporated into a puddle.

Illustrative examples of the binder include hydroxypropyl methyl cellulose, methyl cellulose, hydroxyethyl cellulose, carboxyl methyl cellulose, and a polyvinyl alcohol. Illustrative examples of the dispersant include ethylene glycol, dextrin, a fatty acid soap, and a polyalcohol. These additives can be used solely or in combination of two or more according to purposes.

In the present invention, a method for preparing a puddle is not particularly limited. For example, a puddle can be manufactured by adding 5 to 40 parts by mass of the whole pore-forming agent inclusive of carbon, 10 to 40 parts by mass of water, and optionally, 3 to 5 parts by mass of a binder and 0.5 to 2 parts by mass of a dispersant to 100 parts by mass of cordierite-forming raw material and kneading these materials together.

Further, as a method for manufacturing a molded article having a honeycomb structure with use of thus obtained puddle, one may use extrusion molding, injection molding or press molding, for example. Of these, extrusion molding is preferred since it facilitates continuous molding and can cause cordierite crystals to orient so as to impart low thermal expandability to the molded article.

As a method of drying the molded article, hot air drying, microwave drying, dielectric drying, drying under reduced pressure, vacuum drying or freeze-drying may be used, for example. Particularly, it is preferable to dry the molded article in a drying step comprising a combination of hot air drying and microwave drying or dielectric drying because the whole molded article can be dried quickly and uniformly.

Then, in the present invention, the dried molded article is fired by raising a firing environment temperature at a rate at which carbon existing in a center portion of the molded article is burned out within a temperature ranging from 1,200° C. (inclusive) to 1,430° C. (not inclusive) as temperature of the center portion of the molded article.

As described above, with a temperature increasing rate at which carbon existing in the center portion of the molded article is burned out at a temperature below 1,200° C., pores of partition walls in center and peripheral portions of a structure body to be obtained have the same pore diameter or tears due to firing shrinkage occur in the structure body, so that the structure body to be obtained cannot be used as a structure body. On the other hand, with a temperature increasing rate at which carbon existing in the center portion of the molded article is not burned out completely even at a temperature exceeding 1,430° C., cordierite constituting partition walls is molten, thereby causing clogging of pores or tears due to firing crack of the partition walls in the structure body to be obtained.

To determine the environment temperature increasing rate so as to burn carbon existing in the center portion of the molded article at a temperature of from 1,200° C. to below 1,430° C. as a temperature of the center portion of the molded article, it must be determined by considering all such factors as the content of carbon, the content of oxygen in the firing environment, types and contents of other pore-forming agents and the size of the molded article comprehensively.

For example, when the content of carbon is few, an environment temperature increasing rate until the temperature of the center portion of the molded article reaches at least 1,200° C. must be fast since all carbon is liable to be burned out before the temperature of the center portion of the molded article reaches 1,200° C. Similarly, when the content of oxygen in the firing environment is rich, the environment temperature increasing rate until the temperature of the center portion of the molded article reaches at least 1,200° C. must also be fast since burnout of carbon is accelerated.

On the other hand, when the molded article to be fired is large in size, the environment temperature increasing rate until the temperature of the center portion of the molded article reaches at least 1,200° C. must be slow since an amount of oxygen to be fed in the center portion is small.

Meanwhile, when other pore-forming agent such as a foamable resin is contained, a temperature at which the formable resin is burned out is 300 to 400° C. which is lower than a temperature at which carbon is burned out. Therefore, at a temperature at which carbon starts to burn, pores are already formed due to burnout of the foamable resin, and an environment in which burnout of carbon is apt to be accelerated is already formed. Accordingly, when other pore-forming agent such as the foamable resin or the like is contained, the larger the content of the pore-forming agent is, the faster the environment temperature increasing rate must be. Indeed, one may burn a molded article by choosing a proper environment temperature increasing rate within a range of from 20 to 60° C./hr, taking into consideration the size of the molded article to be burned, the kind, the amount, or the like of the pore-forming agent.

More specifically, for example, when a honeycomb structure body having a porosity of 57 to 61% and a size of φ190.5 mm×L203.2 mm to φ266.7 mm×L305.0 mm is manufactured by use of a raw material containing 10 parts by mass of activated carbon and 2 parts by mass of foamable resin based on 100 parts by mass of cordierite-forming raw material, a molded article is preferably fired at an environment temperature increasing rate between 400° C. and 1,150° C. of 30 to 35° C./hr (when the molded article is fired at the same temperature increasing rate). Further, when a honeycomb structure body having a larger size of φ305.0 mm×L356.0 mm is manufactured, a molded article is preferably fired at an environment temperature increasing rate between 400° C. and 1,150° C. of 20 to 30° C./hr.

Further, for example, when a honeycomb structure body having a porosity of 65 to 70% and a size of φ144.0 mm×L152.0 mm is manufactured by use of a raw material containing 10 parts by mass of activated carbon and 2.2 to 2.6 parts by mass of formable resin based on 100 parts by mass of cordierite-forming raw material, a molded article is preferably fired at an environment temperature increasing rate between 400° C. and 1,150° C. of 50 to 90° C./hr (when the molded article is fired at the same temperature increasing rate). In addition, when graphite is used as a pore-forming agent in place of activated carbon, the above temperature increasing rate may be applied to environment temperatures from 400° C. to 1,150° C. or from 600° C. to 1,150° C.

Further, changes in porosity and the average pore diameter from the most outer periphery toward the central axis can be made large near the most outer periphery by rendering the environment temperature increasing rate fast and can be made gradual from the peripheral portion to the center portion by rendering the environment temperature increasing rate slow.

EXAMPLES

Hereinafter, the present invention will be further described with reference to Examples. However, the present invention shall not be limited by these Examples in any way.

1. Evaluation Method

Honeycomb structure bodies obtained in the following Examples and Comparative Examples were evaluated in accordance with the following methods.

(1) Pore Diameter

Figure 2:
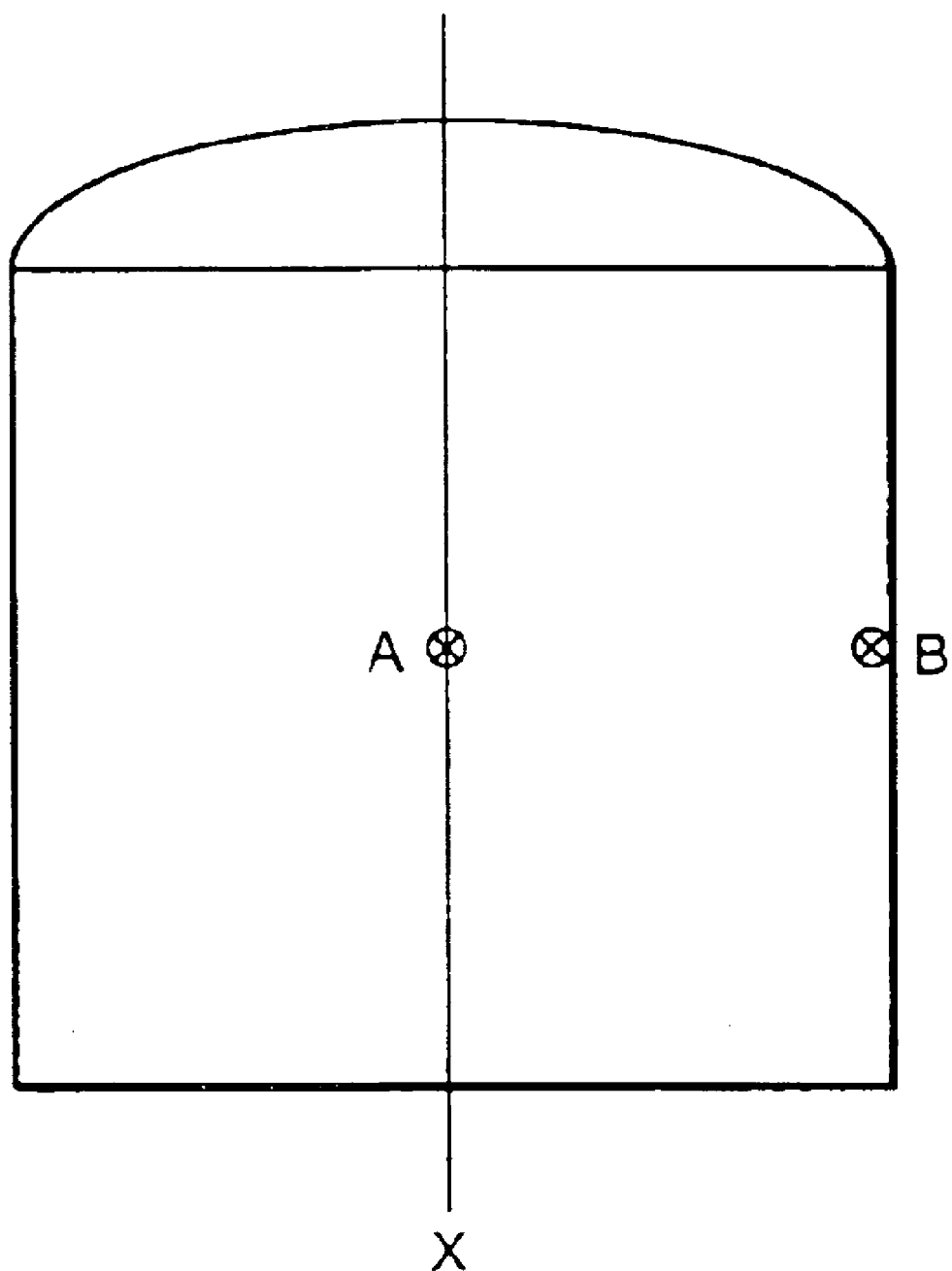
FIG. 2 is an explanatory schematic view to show sites at which the porosity and the pore diameter of a porous honeycomb structure body were measured in Examples and Comparative Examples.

As shown in FIG. 2, a pore diameter of a partition wall portion (hereinafter referred to as "center portion") located at a midpoint A of a central axis X or a honeycomb structure body or at a position closest to the midpoint and a pore diameter of a partition wall (hereinafter referred to as "peripheral portion") located at a position B which was outermost from the midpoint in a direction perpendicular to the central axis were measured by use of a mercury injection porosimeter manufactured by Micromeritics Corporation.

(2) Porosity

A total volume of pores in the center and peripheral portions of the honeycomb structure body was measured by use of the mercury injection porosimeter manufactured by Micromeritics Corporation, and porosity was calculated from the total pore volume, with an absolute specific gravity of cordierite of 2.52 g/cc.

(3) Soot Collection Pressure Loss

Firstly, against both end surfaces of each of honeycomb structure bodies obtained in Examples and Comparative Examples, a ring having an internal diameter of $\phi$215 mm was pressed, and through the rings, soot generated by a soot generator was caused to flow into a range of $\phi$215.0 mm of the honeycomb structure body to collect 33 g of soot. Then, air of 6.2 $Nm^3$/min was caused to flow with the soot collected on the structure body, and a difference in pressure between both sides of the structure body was measured to evaluate a pressure loss of the structure body having the soot collected thereon.

(4) Isostatic Strength

Firstly, both sides of the honeycomb structure body were covered with a metal plate having the same diameter as that of the honeycomb structure body, the metal plates were secured with a rubber tube having the same diameter as that of the honeycomb structure body, and a rubber tape was applied to and around the rubber tubes to seal the structure body against entry of water. Then, the thus sealed honeycomb structure body was immersed in water, a water pressure was raised until the structure body was broken, and isostatic strength (MPa) was evaluated based on the water pressure at which the structure body was broken.

(5) Determination Method for Rising Ratio of Pressure Loss

Each of the catalyst bodies prepared by loading the respective honeycomb structure bodies obtained in Example 9 and Comparative Example 11 with a catalyst was canned in a metal case, respectively. Then, hot air having a temperature of 400° C. was flown into each of the canned catalyst bodies at a flow rate of 13 $m^3$/min. The pressure difference between the inlet portion and the outlet portion was measured to obtain the pressure loss A1. The same procedure was repeated by using canned respective honeycomb structure bodies in which no catalyst was loaded to obtain the pressure loss A2. The rising ratio of pressure loss is obtained from the following equation:

Rising ratio of pressure loss=$(A1-A2)/A2 \times 100$.

(6) Test on Purification Efficiency of Exhaust Gas

Each of the catalyst bodies prepared as a sample for the determination of pressure loss was also used for the determination of purification efficiency. The purification efficiency of exhaust gas was evaluated by using 5 liters diesel engine. The exhaust gas from the engine was led into each of the catalyst bodies. The HC concentration in the exhaust gas at the inlet of the catalyst body, B1 and the HC concentration in the exhaust gas at the outlet thereof, B2 were determined. The purification efficiency was calculated from the following equation:

Purification efficiency=$(B1-B2)/B1 \times 100$.

2. Examples, Comparative Examples, and Evaluations Thereof

As shown in No. 1 in Table 1, 39.8% by mass of talc (average particle diameter: 21 $\mu$m), 18.5% by mass of kaolin (average particle diameter: 11 $\mu$m), 14.0% by mass of alumina (average particle diameter: 7 $\mu$m), 15.2% by mass of aluminium hydroxide (average particle diameter: 2 $\mu$m), and 12.5% by mass of silica (average particle diameter: 25 $\mu$m) were mixed together so as to manufacture a cordierite-forming raw material.

Then, based on 100 parts by mass of the cordierite-forming raw material, 10.0 parts by mass of carbon (graphite) (average particle diameter: 53 $\mu$m), 2.0 parts by mass of formable resin (average particle diameter: 50 $\mu$m), 4 parts by mass of binder, 0.5 parts by mass of surfactant, and 31 parts by mass of water were charged into a kneader and then kneaded for 60 minutes so as to obtain a puddle.

Then, the obtained puddle was charged into a vacuum tug mill and kneaded so as to manufacture a cylindrical puddle, and the puddle was then charged into an extruder to be molded into a honeycomb shape. Then, after subjected to dielectric drying, the molded article was absolute-dried by hot-air drying, and both end faces thereof were cut off to a given size.

Then, openings of through holes of the dried honeycomb article were clogged at alternately different position at both end faces by use of slurry made of a cordierite-forming raw material of the same composition.

Finally, the article was fired at 600 to 1,150° C. within an oxygen concentration of 10 to 15% by volume in accordance with a temperature schedule shown in No. 1 in Table 2 so as to obtain a honeycomb structure body (honeycomb filter) having a size of $\phi$229.0 mm×L305.0 mm, a partition wall thickness of 300 $\mu$m, and 300 cells/inch$^2$ (46.5×10$^{-2}$/mm$^2$).

Example 2

A honeycomb structure body (honeycomb filter) was obtained in the same manner as in Example 1 except that a molded article was fired in accordance with a temperature schedule shown in No. 2 in Table 2.

Example 3

A honeycomb structure body (honeycomb filter) was obtained in the same manner as in Example 1 except that a molded article was fired in accordance with a temperature schedule shown in No. 3 in Table 2.

Comparative Example 2

A honeycomb structure body (honeycomb filter) was obtained in the same manner as in Example 1 except that as shown in No. 2 in Table 1, silica with an average particle diameter of 35 $\mu$m was used, and based on 100 parts by mass of a cordierite-forming raw material, 20.0 parts by mass of carbon (graphite), 1.5 parts by mass of formable resin, 4 parts by mass of binder, 0.5 parts by mass of surfactant and 34 parts by mass of water were charged into a kneader and then kneaded for 60 minutes so as to obtain a puddle.

Example 3

A honeycomb structure body (honeycomb filter) was obtained in the same manner as in Example 1 except that as shown in No. 2 in Table 1, silica with an average particle diameter of 35 μm was used, and based on 100 parts by mass of a cordierite-forming raw material, 20.0 parts by mass of carbon (graphite), 1.5 parts by mass of formable resin, 4 parts by mass of binder, 0.5 parts by mass of surfactant and 34 parts by mass of water were charged into a kneader and kneaded for 60 minutes so as to obtain a puddle, and a molded article was fired in accordance with a temperature schedule shown in No. 2 in Table 2.

Comparative Example 3

A honeycomb structure body (honeycomb filter) was obtained in the same manner as in Example 1 except that as shown in No. 2 in Table 1, silica with an average particle diameter of 35 μm was used, and based on 100 parts by mass of a cordierite-forming raw material, 20.0 parts by mass of carbon (graphite), 1.5 parts by mass of formable resin, 4 parts by mass of binder, 0.5 parts by mass of surfactant and 34 parts by mass of water were charged into a kneader and kneaded for 60 minutes so as to obtain a puddle, and a molded article was fired in accordance with a temperature schedule shown in No. 3 in Table 2.

Example 4

A honeycomb structure body (honeycomb filter) was obtained in the same manner as in Example 1 except that as shown in No. 3 in Table 1, silica with an average particle diameter of 35 μm was used, and based on 100 parts by mass of a cordierite-forming raw material, 5.0 parts by mass of carbon (graphite), 3.0 parts by mass of formable resin, 4 parts by mass of binder, 0.5 parts by mass of surfactant and 30 parts by mass of water were charged into a kneader and kneaded for 60 minutes so as to obtain a puddle, and a molded article was fired in accordance with a temperature schedule shown in No. 4 in Table 2.

Comparative Example 4

A honeycomb structure body (honeycomb filter) was obtained in the same manner as in Example 1 except that as shown in No. 3 in Table 1, silica with an average particle diameter of 35 μm was used, and based on 100 parts by mass of a cordierite-forming raw material, 5.0 parts by mass of carbon (graphite), 3.0 parts by mass of formable resin, 4 parts by mass of binder, 0.5 parts by mass of surfactant and 30 parts by mass of water were charged into a kneader and kneaded for 60 minutes so as to obtain a puddle, and a molded article was fired in accordance with a temperature schedule shown in No. 3 in Table 2.

Comparative Example 5

A honeycomb structure body (honeycomb filter) was obtained in the same manner as in Example 1 except that as shown in No. 3 in Table 1, silica with an average particle diameter of 35 μm was used, and based on 100 parts by mass of a cordierite-forming raw material, 5.0 parts by mass of carbon (graphite), 3.0 parts by mass of formable resin, 4 parts by mass of binder, 0.5 parts by mass of surfactant and 30 parts by mass of water were charged into a kneader and kneaded for 60 minutes so as to obtain a puddle, and a molded article was fired in accordance with a temperature schedule shown in No. 1 in Table 2.

TABLE 1

Preparation Composition

| No. | Cordierite-Forming Raw Material (wt %) | | | | | Carbon (Parts by mass) | Foamable Resin (Parts by mass) | Water (Parts by mass) | Binder (Parts by mass) | Surfactant (Parts by mass) |
|---|---|---|---|---|---|---|---|---|---|---|
| | Talc | Kaolin | Alumina | Aluminium Hydroxide | Silica | | | | | |
| 1 | 39.8 (21) | 18.5 (11) | 14.0 (7) | 15.2 (2) | 12.5 (25) | 10.0 (53) | 2.0 (50) | 31 | 4 | 0.5 |
| 2 | 39.8 (21) | 18.5 (11) | 14.0 (7) | 15.2 (2) | 12.5 (35) | 20.0 (53) | 1.5 (50) | 34 | 4 | 0.5 |
| 3 | 39.8 (21) | 18.5 (11) | 14.0 (7) | 15.2 (2) | 12.5 (35) | 5.0 (53) | 3.0 (50) | 30 | 4 | 0.5 |

Note:
Number in parentheses means the average particle diameters (μm)

TABLE 2

Firing Conditions

| No. | Temperature Increasing Rate of Environment (° C./hr) | | | | | | | | | | | | Cooling Rate of Environment (° C./hr) | | Firing Time (hr) |
|---|---|---|---|---|---|---|---|---|---|---|---|---|---|---|---|
| | RT to 200 | to 300 | to 600 | to 900 | To 1,000 | 1,000 to 1,150 | to 1,200 | To 1,300 | To 1,400 | to 1,425 | 1,425 | to 1,200 | to 100 | | |
| 1 | 30 | 4 | 10 | 35 | 35 | 0 | 35 | 5 | 70 | 50 | 20 | 7 | 50 | 200 | 108.4 |
| 2 | 30 | 4 | 10 | 20 | 20 | 0 | 20 | 5 | 70 | 50 | 20 | 7 | 50 | 200 | 120.2 |
| 3 | 30 | 4 | 10 | 20 | 10 | 10 | 50 | 50 | 70 | 50 | 20 | 7 | 50 | 200 | 121.7 |
| 4 | 30 | 4 | 10 | 60 | 60 | 0 | 60 | 5 | 70 | 50 | 20 | 7 | 50 | 200 | 101.8 |

Evaluation Results

As for soot collection efficiency, although not specifically shown in Table 3, a soot collection efficiency of 95 to 98% which was satisfactory from a practical standpoint was attained in Examples and Comparative Examples.

Examples 1 and 2 and Comparative Example 1

These Examples and Comparative Example are the same in that the honeycomb molded article was manufactured by use of the puddle containing 10.0 parts by mass of carbon (graphite) and 2.0 parts by mass of formable resin based on 100 parts by mass of the cordierite-forming raw material and different in that the molded articles were fired in accordance with temperature schedules shown in Nos. 1 to 3 in Table 2, respectively.

As shown in Table 3, in Example 1 in which the molded article was burned at an environment temperature increasing rate of 35° C./hr between 600° C. and 1,150° C. and Example 2 in which the molded article was burned at an environment temperature increasing rate of 20° C./hr between 600° C. and 1,150° C., carbon (graphite) was all burned out at temperatures ranging from 1,200° C. to lower than 1,430° C., i.e., at 1,290° C. (temperature of a center portion of the molded article) in Example 1 and at 1,220° C. (temperature of a center portion of the molded article) in Example 2, and the honeycomb structure bodies could be obtained without firing crack. Further, in all of the obtained honeycomb structure bodies, a pore diameter and porosity of a center portion were larger than those of a peripheral portion by at least 2 μm and at least 2%, respectively. Therefore, in spite of large isostatic strengths of not lower than 2.9 MPa, soot collection pressure losses were as small as 5.9 kpa or smaller. Particularly, in Example 1 in which the environment temperature increasing rate between 600° C. and 1,150° C. was fast, a pore diameter and porosity of a center portion were larger than those of a peripheral portion by 5 μm and 5%, respectively, and a soot collection pressure loss was particularly small as 5.2 kpa.

Meanwhile, in Comparative Example 1 in which the molded article was fired under commonly used firing conditions, i.e., the article was fired at an environment temperature increasing rate of 20° C./hr between 600° C. and 900° C. and 10° C./hr between 900° C. and 1,000° C. and then retained at 1,000° C. for 10 hours, carbon in a center portion of the molded article was burned out at 1,160° C. (temperature of the center portion of the molded article), and firing crack were observed in the obtained honeycomb structure body. Thus, the obtained honeycomb structure body was not practically usable as a honeycomb filter.

Figure 5:
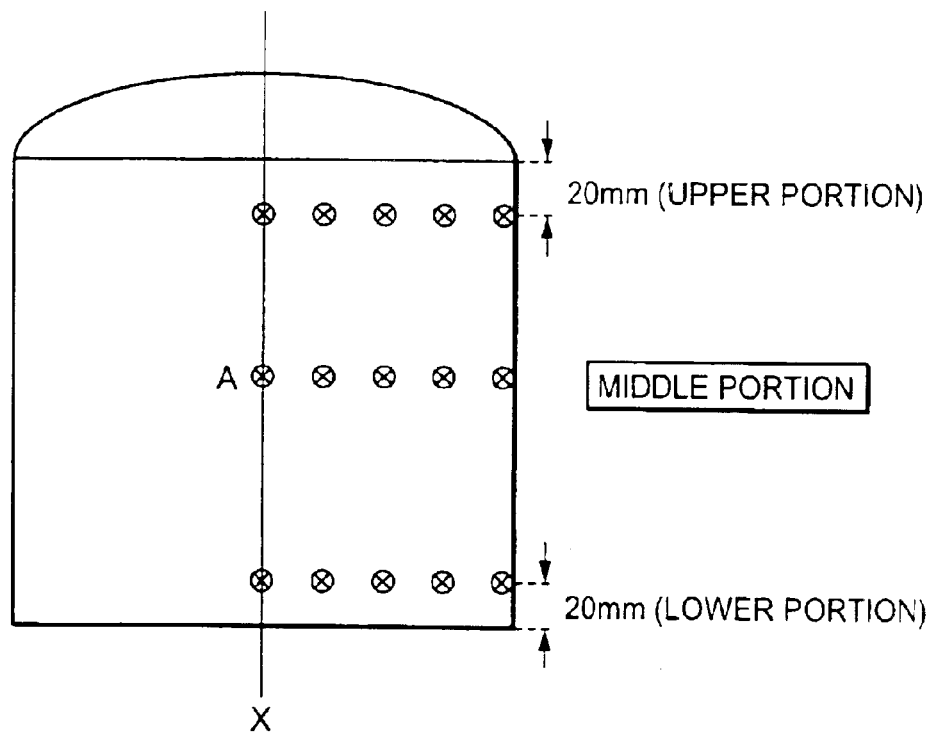
FIG. 5 is an explanatory schematic view to show sites at which the porosity and the pore diameter of a porous honeycomb structure body in Example 1 were measured.
Figure 6:
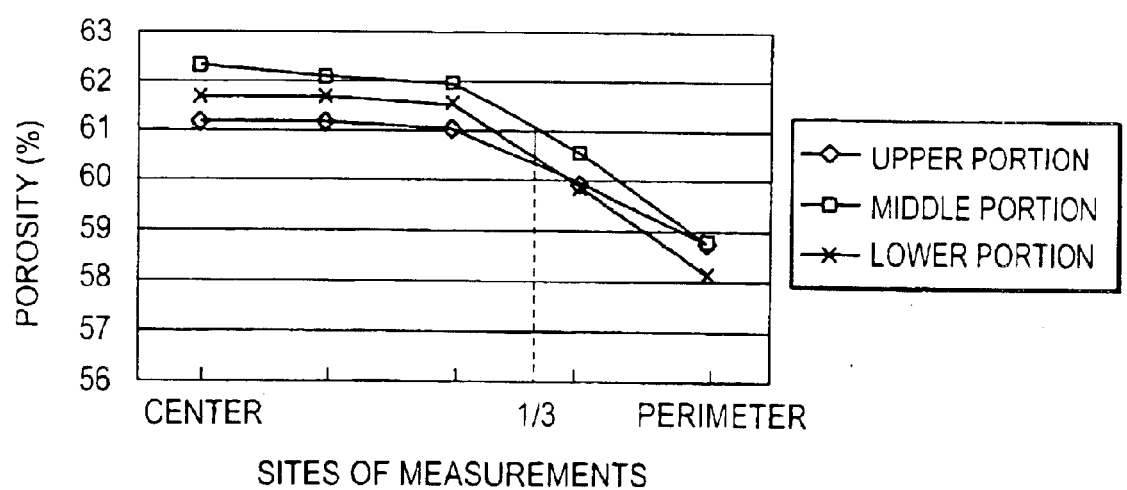
FIG. 6 is a graph showing the results of measuring the porosity of the porous honeycomb structure body in Example 1 at various sites between the center portion and the peripheral portion.
Figure 7:
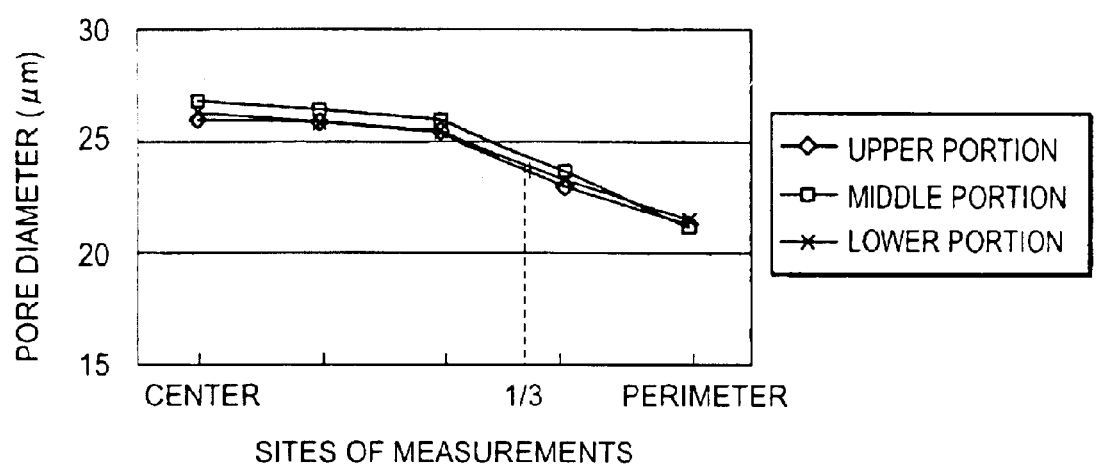
FIG. 7 is a graph showing the results of measuring the pore diameter of the porous honeycomb structure body in Example 1 at various sites between the center portion and the peripheral portion.

Further, with respect to the honeycomb structure body obtained in Example 1, a pore diameter and porosity of a partition wall located at every 28.6 mm from the midpoint A (center) of the central axis in a direction perpendicular to the central axis were measured as shown in FIG. 5. As a result, it was found that the porosity and pore diameter changed continuously from the peripheral portion toward the center portion and that amounts of changes in porosity and pore diameter between the peripheral portion and a partition wall which forms a cell located at ⅓, from the most outer periphery, of the length between the most outer periphery and the central axis corresponded to 71% and 69% of overall amounts of changes, respectively, as shown in FIGS. 6 and 7.

Example 3 and Comparative Examples 2 and 3

These Example and Comparative Examples are the same in that the honeycomb structure body (honeycomb filter) was manufactured by use of the puddle containing 20.0 parts by mass of carbon and 1.5 parts by mass of formable resin based on 100 parts by mass of the cordierite-forming raw material (in which carbon is not easily burned out until the temperature of the puddle reaches a temperature higher than the temperature range of the foregoing Example 1) and different in that the molded articles were fired in accordance with temperature schedules shown in Nos. 1 to 3 in Table 2, respectively.

As shown in Table 3, in Example 3 in which the molded article was burned at an environment temperature increasing rate of 20° C./hr between 600° C. and 1,150° C., carbon in a center portion of the molded article was burned out at temperatures ranging from 1,200° C. to lower than 1,430° C., i.e., at 1,350° C. (temperature of the center portion of the molded article), and the honeycomb structure body could be obtained without firing crack. Further, differences in pore diameter and porosity between the center portion and peripheral portion of the obtained honeycomb structure body were very large as 7 μm and 6%, respectively. Therefore, in spite of a large isostatic strength of 2.9 MPa, a soot collection pressure loss was very small as 5.0 kpa.

Meanwhile, in Comparative Example 2 in which the molded article was fired at an environment temperature increasing rate of 35° C./hr between 600° C. and 1,150° C., carbon in a center portion of the molded article was burned out at a temperature of not lower than 1,430° C., i.e., 1,445° C. (temperature of the center portion of the molded article) which was the melting point of cordierite, and the obtained honeycomb structure body had firing crack portions due to melting of a partition wall and was not practical as a structure body. Further, in Comparative Example 3 in which the molded article was fired under conventionally generally used firing conditions, i.e., the article was fired at an environment temperature increasing rate of 20° C./hr between 600° C. and 900° C. and 10° C./hr between 900° C. and 1,000° C. and then retained at 1,000° C. for 10 hours, carbon in a center portion of the molded article was burned out at 1,135° C. (temperature of the center portion of the molded article), and firing crack was observed in the obtained honeycomb structure body.

Example 4 and Comparative Examples 4 and 5

These Example and Comparative Examples are the same in that the honeycomb structure body (honeycomb filter) was manufactured by use of the puddle containing 5.0 parts by mass of carbon and 3.0 parts by mass of formable resin based on 100 parts by mass of the cordierite-forming raw material (in which carbon is easily burned out at a temperature lower than the temperature range of the foregoing Example 1) and different in that the molded articles were fired in accordance with temperature schedules shown in Nos. 1, 3 and 4 in Table 2, respectively.

As shown in Table 3, in Example 4 in which the molded article was burned at an environment temperature increasing rate of 60° C./hr between 600° C. and 1,150° C., carbon in a center portion of the molded article was burned out at temperatures ranging from 1,200° C. to lower than 1,430° C., i.e., at 1,285° C. (temperature of the center portion of the molded article), and the honeycomb structure body could be obtained without firing crack. Further, differences in pore diameter and porosity between the center portion and peripheral portion of the obtained honeycomb structure body were as large as 3 μm and 3%, respectively. Therefore, although an isostatic strength of 2.8 MPa which was almost satisfactory from the viewpoint of practicality was obtained, a soot collection pressure loss was very small as 5.2 kpa.

Meanwhile, in Comparative Example 4 in which the molded article was fired under conventionally generally used firing conditions, i.e., the article was fired at an environment temperature increasing rate of 20° C./hr between 600° C. and 900° C. and 10° C./hr between 900° C. and 1,000° C. and then retained at 1,000° C. for 10 hours, carbon in a center portion of the molded article was burned out before the temperature of the molded article reached a temperature range in which firing shrinkage was significant, i.e., at 950° C. (temperature of the center portion of the molded article). Further, although no firing cracks were observed in the obtained honeycomb structure body, there were no differences in pore diameter and porosity between the peripheral portion and center portion of the structure body. Thus, although an isostatic strength of 2.8 MPa which was similar to that in Example 3 was obtained, a soot collection pressure loss was 5.9 kpa which was larger than that in Example 3. Further, in Comparative Example 5 in which the molded article was burned at an environment temperature increasing rate of 35° C./hr between 600° C. and 1,150° C., carbon in a center portion of the molded article was burned out at 1,150° C. (temperature of the center portion of the molded article), and firing cracks were observed in the obtained honeycomb structure body.

TABLE 3

Examples and Comparative Examples

| | Prep. No. | Firing Temp. Program | Temp. at Which Graphite Was Burned Out | Firing Breakage | Pore Diameter (μm) Peripheral Portion | Pore Diameter (μm) Center Portion | Porosity (%) Peripheral Portion | Porosity (%) Center Portion | Soot Collection Pressure Loss (Kpa) | Isostatic Strength (MPa) |
|---|---|---|---|---|---|---|---|---|---|---|
| Exam. 1 | 1 | 1 | 1,290 | Not Seen | 19 | 24 | 59 | 64 | 5.2 | 2.9 |
| Exam. 2 | 1 | 2 | 1,220 | Not Seen | 19 | 21 | 59 | 61 | 5.9 | 3 |
| Comp. Ex. 1 | 1 | 3 | 1,160 | Seen | 19 | 20 | 59 | 60 | — | — |
| Comp. Ex. 2 | 2 | 1 | 1,445 | Seen | 18 | — | 60 | — | — | — |
| Exam. 3 | 2 | 2 | 1,350 | Not Seen | 18 | 25 | 60 | 66 | 5.0 | 2.9 |
| Comp. Ex. 3 | 2 | 3 | 1,135 | Seen | 18 | 19 | 60 | 61 | — | — |
| Exam. 4 | 3 | 4 | 1,285 | Not Seen | 21 | 24 | 61 | 64 | 5.2 | 2.8 |
| Comp. Ex. 4 | 3 | 3 | 950 | Not Seen | 21 | 21 | 61 | 61 | 5.9 | 2.8 |
| Comp. Ex. 5 | 3 | 1 | 1,150 | Seen | 21 | 22 | 61 | 62 | — | — |

Examples 5 to 7 and Comparative Examples 6 and 7

Honeycomb structure bodies (honeycomb filter) were produced in the same manner as in Example 1 except that honeycomb molded articles to be fired having sizes of φ5.66 inch×L6.0 inch (φ143.8 mm×L152.4 mm), φ7.5 inch×L8.0 inch (φ190.5 mm×L203.2 mm), φ9.0 inch×L8.0 inch (φ228.6 mm×L203.2 mm), φ10.5 inch×L12.0 inch (φ266.7 mm×L304.8 mm) and φ12.0 inch×L14.0 inch (φ304.8 mm×L355.6 mm) were manufactured and that these articles were fired in accordance with a temperature program of No. 5 shown in Table 4.

TABLE 4

Firing Conditions (2)

| | Temperature Increasing Rate of Environment (° C./hr) | | | | | | | | | | | | | | Cooling Rate of Environment (° C./hr) | | Firing |
|---|---|---|---|---|---|---|---|---|---|---|---|---|---|---|---|---|---|
| No. | RT to 120 | to 190 | 190 | to 300 | To 400 | to 600 | to 800 | to 1,150 | to 1,200 | To 1,300 | to 1,350 | to 1,400 | to 1,425 | 1425 | to 1,200 | to 100 | Time (hr) |
| 5 | 30 | 20 | 12 | 4 | 7 | 10 | 35 | 35 | 0 | 70 | 70 | 30 | 25 | 7 | 50 | 200 | 127.5 |
| 6 | 30 | 20 | 12 | 4 | 7 | 10 | 30 | 20 | 2 | 70 | 50 | 50 | 20 | 7 | 50 | 200 | 141.0 |

Evaluation Results

Figure 3:
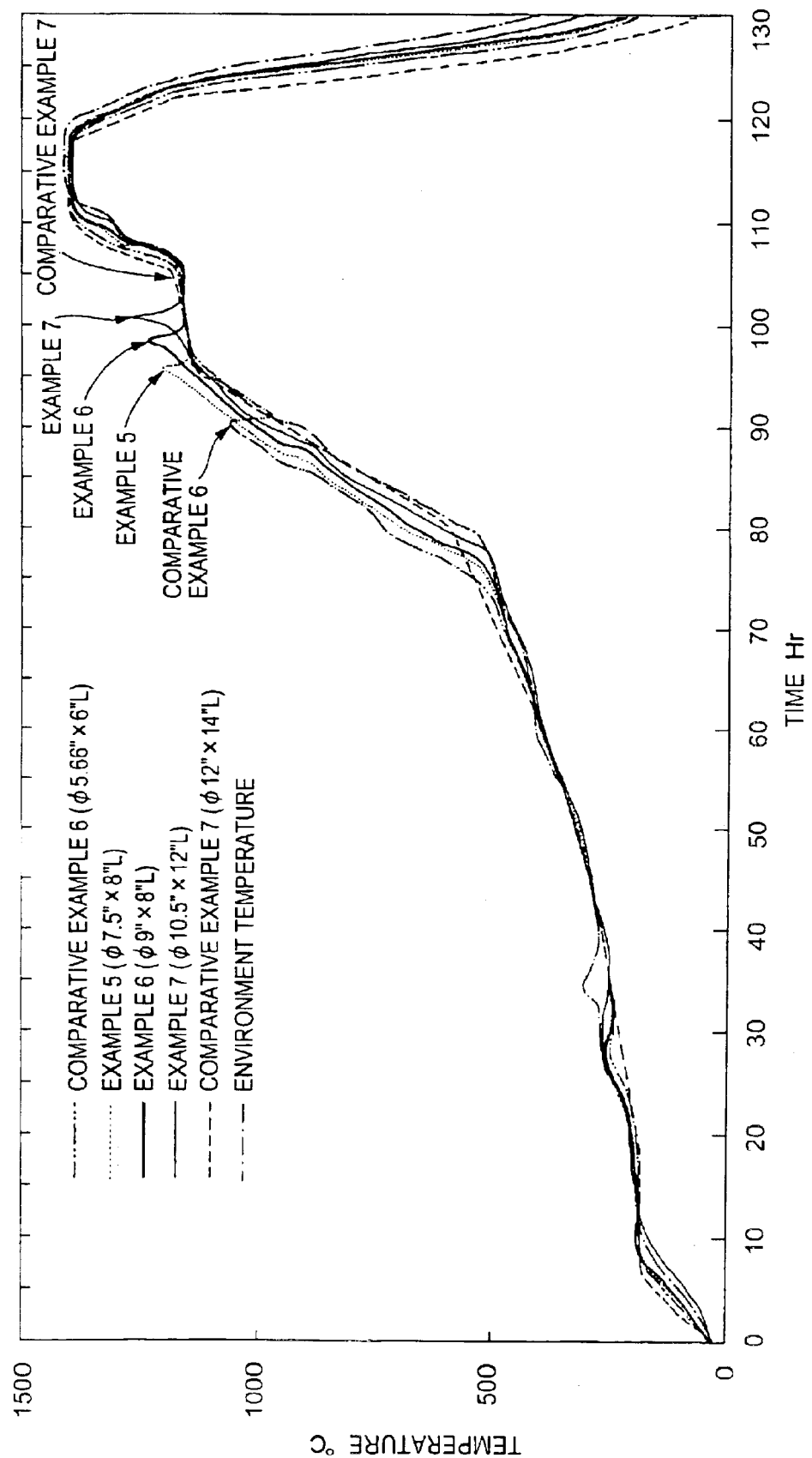
FIG. 3 is a graph illustrating how temperature of center portions of molded articles and temperature of a firing environment increased in firing steps in Examples and Comparative Examples.

As shown in FIG. 3, in Comparative Example 6 in which the molded article having a size of φ5.66 inch×L6.0 inch (φ143.8 mm×L152.4 mm) was fired, a peak indicating that carbon in a center portion of the molded article was burned out at 1,080° C. (temperature of the center portion of the molded article) at which firing shrinkage was large was recognized. Further, in Comparative Example 7 in which the molded article having a size of φ12.0 inch×L14.0 inch (φ304.8 mm×L355.6 mm) was fired, a peak indicating that carbon in a center portion of the molded article was burned out at about 1,310° C. (temperature of the center portion of the molded article) was recognized.

In contrast, in Examples 5 to 7 in which the molded articles having sizes of φ7.5 inch×L8.0 inch (φ190.5 mm×L203.2 mm), φ9.0 inch×L8.0 inch (φ228.6 mm×L203.2 mm) and φ10.5 inch×L12.0 inch (φ266.7 mm×L304.8 mm) were fired, peaks indicating that carbon in center portions of the molded articles was burned out at temperatures ranging from 1,200° C. to lower than 1,430° C., i.e., at 1,220° C., 1,250° C. and 1,290° C. (temperatures of the center portions of the molded articles), respectively, were recognized.

Example 8 and Comparative Examples 8 to 10

Honeycomb structure bodies (honeycomb filter) were produced in the same manner as in Example 1 except that honeycomb molded articles to be fired having sizes of φ5.66 inch×L6.0 inch (φ143.8 mm×L152.4 mm), φ7.5 inch×L8.0 inch (φ190.5 mm×L203.2 mm), φ9.0 inch×L8.0 inch (φ228.6 mm×L203.2 mm) and φ10.5 inch×L12.0 inch (φ266.7 mm×L304.8 mm) were manufactured and that these molded articles were fired in accordance with a temperature program of No. 6 shown in Table 4.

Evaluation Results

Figure 4:
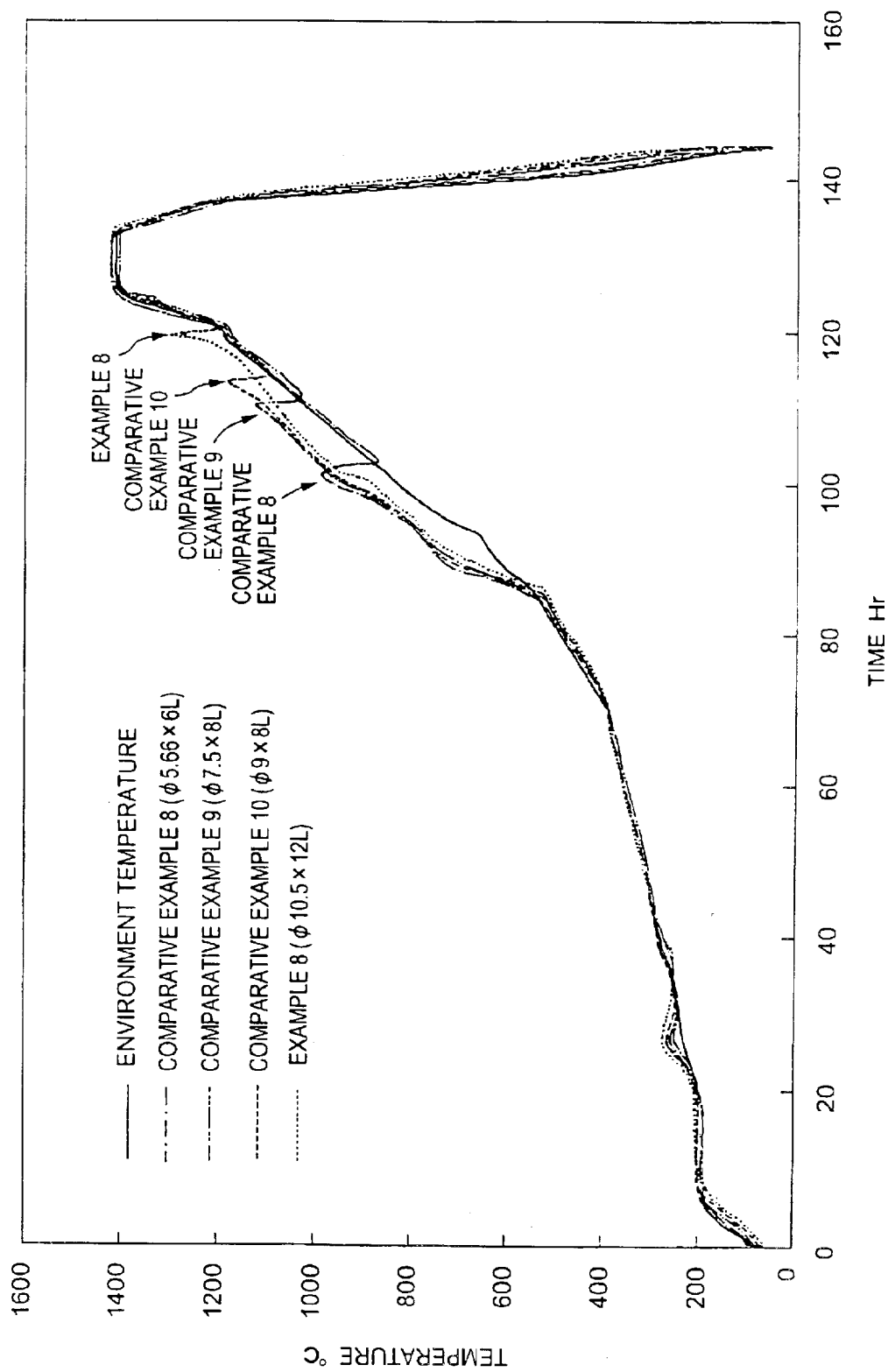
FIG. 4 is a graph illustrating how temperature of center portions of molded articles and temperature of a firing environment increased in firing steps in Examples and Comparative Examples.

As shown in FIG. 4, in Comparative Examples 9 and 10 in which the molded articles having sizes of φ7.5 inch×L8.0 inch (φ190.5 mm×L203.2 mm) and φ9.0 inch×L8.0 inch (φ228.6 mm×L203.2 mm) were fired, respectively, peaks indicating that carbon in center portions of the molded articles was burned out at 1,130° C. and 1,190° C. (temperatures of the center portions of the molded articles) at which firing shrinkage was large were recognized. Further, in Comparative Example 8 in which the molded article having a size of φ5.66 inch×L6.0 inch (φ143.8 mm×L152.4 mm) was fired, a peak indicating that carbon in a center portion of the molded article was burned out at 990° C. (temperature of the center portion of the molded article) was recognized.

In contrast, in Example 8 in which the molded article having a size of φ10.5 inch×L12.0 inch (φ266.7 mm×L304.8 mm) was fired, a peak indicating that carbon in a center portion of the molded article was burned out at temperatures ranging from 1,200° C. to lower than 1,430° C., i.e., at 1,310° C. (temperature of the center portion of the molded article) was recognized.

Example 9

Honeycomb structure bodies (carrier for catalyst) having the size of φ229.0 mm×L152.0 mm), the thickness of the partition walls of 300 μm, and the cell density of 300 cells/inch$^2$ were manufactured in the same manner as in Example 1 except that no plugging of the openings at the end faces was carried out. Each of thus prepared honeycomb structure bodies was loaded with 500 g of a mixture of an alumina having a high specific area and Pt-containing oxidative catalyst to obtain a catalyst body, respectively. The pore diameter in the peripheral portion and that in central portion of resultant catalyst body were 14 μm and 19 μm, respectively. The porosity in the peripheral portion and that in central portion of resultant catalyst body were 54% and 59%, respectively.

Comparative Example 11

Honeycomb structure bodies (carrier for catalyst) having the size of φ229.0 mm×L152.0 mm), the thickness of the partition walls of 300 μm, and the cell density of 300 cells/inch$^2$ were manufactured in the same manner as in Comparative Example 4 except that no clogging of the openings at the end faces was carried out. Each of thus prepared honeycomb structure bodies was loaded with 500 g of a mixture of an alumina having a high specific area and Pt-containing oxidative catalyst to obtain a catalyst body, respectively. The pore diameter in the peripheral portion and that in central portion of resultant catalyst body were 15 μm and 15 μm, respectively. The porosity in the peripheral portion and that in central portion of resultant catalyst body were 55% and 55%, respectively.

TABLE 5

| | Puddle No. | Firing program | Temp. at which graphite is burned out | Firing cracks | Pore diameter *1 (μm) | | Porosity *1 (%) | | Increase ratio in pressure loss (%) | Purification effects of exhaust gas (%) | Iso-static strength (MPa) |
|---|---|---|---|---|---|---|---|---|---|---|---|
| | | | | | Peripheral Portion | Central Portion | Peripheral Portion | Central Portion | | | |
| Exam. 9 | 1 | 1 | 1270° C. | Not observed | 14 | 19 | 54 | 59 | 5 | 70 | 5.8 |
| Comp. Exam. 11 | 3 | 3 | 910° C. | Not observed | 15 | 15 | 55 | 55 | 11 | 58 | 5.5 |

Remark:
*1 means the data after catalyst loading.

Evaluation Results

As shown in Table 5, in case that the catalyst body prepared by loading a honeycomb structure body according to Example 9 with a catalyst, the isostatic strength of the catalyst body was such large as 5.8 MPa due to the attainment of higher porosity and the increase in catalyst amount loaded derived from the attainment of larger pore diameter since the structure body had a pore diameter and porosity of a center portion of larger than those of a peripheral portion by 4 μm and 4%, respectively, compare with those in the peripheral portion. Therefore, in spite of large, soot collection pressure losses were as small as 5.9 kpa or smaller. Moreover, the increase rate in the pressure loss was such small as 5%, and the purification efficiency of exhaust gas was such large as 70%. On the other hand, in case that the catalyst body prepared by loading a honeycomb structure body having a pore diameter and a porosity in the center portion equal to those in the peripheral portion according to Comparative Example 11 with a catalyst, the isostatic strength of the catalyst body was 5.5 MPa which was smaller than that of the honeycomb structure body according to Example 9. Moreover, the increase rate in the pressure loss was 11%, and the purification efficiency of exhaust gas was 58% both of which were inferior to those of Example 9.

As described above, according to the present invention, a porous honeycomb structure body capable of satisfying a pressure loss and isostatic strength which are mutually contradictory properties simultaneously and suitable for use particularly in a filter for collecting and removing particulates in an exhaust gas, or a carrier for purification catalysts for decomposing and removing NOx, and HC in exhaust gas as well as a method for manufacturing of the porous honeycomb structure body can be provided.

What is claimed is:

1. A porous honeycomb structure body having partition walls which contain cordierite as a primary crystal phase and have a porosity of 40 to 75% and an average pore diameter of 10 to 50 µm, wherein the porosity and the average pore diameter in a center portion of the honeycomb structure body are larger than those in a peripheral portion of the honeycomb structure body.

2. The structure body of claim 1, wherein the porosity in the center portion of the honeycomb structure body is larger than that in the peripheral portion of the honeycomb structure body by at least 2%, and the average pore diameter in the center portion of the honeycomb structure body is larger than that in the peripheral portion of the honeycomb structure body by at least 2 µm.

3. The structure body of claim 1, wherein the porosity in the center portion of the honeycomb structure body is larger than that in the peripheral portion of the honeycomb structure body by at least 3%.

4. The structure body of claim 1, wherein the average pore diameter in the center portion of the honeycomb structure body is larger than that in the peripheral portion of the honeycomb structure body by at least 3 µm.

5. A method for using the structure body of claim 1 as a filter for filtering deleterious materials or as a carrier for loading a catalyst of purification of exhaust gas.

6. A method for manufacturing a porous honeycomb structure body, which comprises the steps of:

preparing a molded article having a honeycomb structure by use of a puddle containing a cordierite-forming raw material as a primary raw material and carbon in an amount of at least 5 parts by mass based on 100 parts by mass of the cordierite-forming raw material, drying and then firing the molded article, wherein upon firing of the molded article, an environment temperature is increased at such a rate that carbon contained in a center portion of the molded article is burned out at a temperature range of from 1,200° C. to 1,400° C.

7. The method of claim 6, wherein the environment temperature is increased at a rate of 20 to 60° C./hr within a temperature range of 400 to 1,150° C.

8. The method of claim 6, wherein the environment temperature is maintained within a temperature range of 1,150 to 1,200° C. for at least 5 hours.

9. The method of claim 6, wherein a puddle containing carbon in an amount of 25 parts or less by mass based on 100 parts by mass of the cordierite-forming raw material is used.

10. The method according to claim 6, wherein an environment in which the molded article is fired comprises an environment temperature of 400 to 1,150° C. and an oxygen concentration of 7 to 17% by volume.

11. The method according to claim 6, wherein a puddle containing a formable resin in an amount of below 5 parts by mass based on 100 parts by mass of the cordierite-forming raw material is used.

* * * * *